United States Patent [19]
Goorjian

[11] Patent Number: 5,651,079
[45] Date of Patent: Jul. 22, 1997

[54] PHOTONIC SWITCHING DEVICES USING LIGHT BULLETS

[75] Inventor: Peter M. Goorjian, Oakland, Calif.

[73] Assignee: The United States of America as represented by the Administrator of the National Aeronautics and Space Administration, Washington, D.C.

[21] Appl. No.: 528,621

[22] Filed: Aug. 25, 1995

[51] Int. Cl.$^6$ .................................................. G02B 6/35
[52] U.S. Cl. ............................ 385/16; 385/122; 385/129
[58] Field of Search ........................ 385/15–18, 20–24, 385/27, 39, 122, 129, 130

[56] References Cited

U.S. PATENT DOCUMENTS

| | | | |
|---|---|---|---|
| 4,856,860 | 8/1989 | Silberberg et al. | 385/122 |
| 4,881,790 | 11/1989 | Mollenauer | 385/15 X |
| 5,297,224 | 3/1994 | Shaw | 385/16 X |
| 5,377,284 | 12/1994 | Bülow | 385/16 X |
| 5,442,720 | 8/1995 | Shaw | 385/16 |

OTHER PUBLICATIONS

Goorjian, P. M. and Silberberg, Y., "Numerical simulation of light bullets, using the full vector, time dependent Maxwell equations," Integrated Photonics Topical Meeting, cosponsored by the Optical Society of America and IEEE/Lasers and Electro–Optics Soc., Dana Point, CA, Feb. 23–25, 1995, 3 pp.

Aitchison, J. S., Weiner, A. M., Silberberg, Y., Oliver, M. K., Jackel, J. L., Leaird, D. E., Vogel, E. M., and Smith, P. W. E., "Observation of spatial optical solitons in a nonlinear planar waveguide," Optics Letters, vol. 15, No. 9, pp. 471–473, May 1, 1990.

Aitchison, J. S. Silberberg, Y., Weiner, A. M., Leaird, D. E., Oliver, M. K., Jackel, J. L., Vogel, E. M., and Smith, P. W. E., "Spatial optical solitons in planar glass waveguides," Journal Optical Society of America B, vol. 8, No. 6, pp. 1290–1297, Jun. 1991.

Borrelli, N. F., Aitken, B. G., and Newhouse, M. A., "Resonant and non–resonant effects in photonic glasses," Journal of Non–Crystalline Solids, pp. 109–122, vol. 185, (1995). [No Month].

Friberg, S. R., Weiner, A. M., Silberberg, Y., Sfiz, B. G., and Smith, P. W., "Femtosecond switching in a dual–core–fiber nonlinear coupler", Optics Letters, vol. 13, No. 10, pp. 904–906, Oct., 1988.

Bell, T. E., "Light that acts like 'natural bits'", IEEE Spectrum, pp. 56–57, Aug. 1990.

(List continued on next page.)

*Primary Examiner*—John D. Lee
*Attorney, Agent, or Firm*—Kenneth L. Warsh; Harry Lupuloff; John G. Mannix

[57] ABSTRACT

The present invention is directed toward a unique ultra-fast, all-optical switching device or switch made with readily available, relatively inexpensive, highly nonlinear photonic glasses. These photonic glasses have a sufficiently negative group velocity dispersion and high nonlinear index of refraction to support stable light bullets. The light bullets counterpropagate through, and interact within the waveguide to selectively change each others' directions of propagation into predetermined channels. In one embodiment, the switch utilizes a rectangularly planar slab waveguide, and further includes two central channels and a plurality of lateral channels for guiding the light bullets into and out of the waveguide. One advantage presented by the present all-optical switching device lies in its practical use of light bullets, thus preventing the degeneration of the pulses due to dispersion and diffraction at the front and back of the pulses. Another feature of the switching device is the relative insensitivity of the collision process to the time difference in which the counter-propagating pulses enter the waveguide, since, contrary to conventional co-propagating spatial solitons, the relative phase of the colliding pulses does not affect the interaction of these pulses. Yet another feature of the present all-optical switching device is the selection of the light pulse parameters which enables the generation of light bullets in highly nonlinear glasses.

20 Claims, 5 Drawing Sheets

OTHER PUBLICATIONS

Silberberg, Y., "Collapse of optical pulses", Optics Letters, vol. 15, pp. 1282–1284, Nov. 15, 1990.

Goorjian, P. M. and Silberberg, Y. "Numerical simulations of light bullets, using the full vector, time dependent Maxwell equations," Nonlinear Optics Topical Meeting, IEEE/Lasers and Electro–Optics Society and Optical Society of America, Waikoloa, Hawaii, Jul. 24–29, 1994, 3 pp.

PHOTONIC SWITCHING DEVICES USING LIGHT BULLETS

ORIGIN OF INVENTION

The invention described herein was made by an employee of the United States Government and may be manufactured and used by or for the Government for governmental purposes without payment of any royalties thereon or therefor.

BACKGROUND OF THE INVENTION

1. Technical Field of the Invention

The present invention is generally directed to photonic switching devices, and it particularly relates to ultra-fast all-optical switching devices using light bullets as optical pulses and made of highly nonlinear optical glasses. More specifically, the present invention relates to an all-optical switching process in a planar slab waveguide.

2. Description of the Prior Art

When a pulse of light travels in a linear dispersive medium its shape changes continuously because its constituent frequency components travel at different velocities and undergo different time delays. If the medium is nonlinear, such that it is characterized by a nonlinear relationship between the polarization density and the electric field, self-phase modulation, which results, for instance, from the Kerr effect, alters the phase, and therefore the frequency of the weak and intense parts of the pulse by unequal amounts. As a result of group-velocity dispersion, different parts of the pulse travel at different velocities, and the pulse shape is altered. The interplay between self-phase modulation and group-velocity dispersion can therefore result in an overall pulse spreading or pulse compression, depending on the magnitudes and signs of these two effects.

Under certain conditions, an optical pulse of prescribed shape and intensity can travel in a nonlinear dispersive medium without altering its shape, as if it were traveling in an ideal linear non dispersive medium. This occurs when the group-velocity dispersion fully compensates for the effect of self-phase modulation. Such pulse-like stationary waves are called solitary waves. Optical solitons are special solitary waves that are orthogonal, in the sense that when two of these waves cross one another in the medium, their intensity profiles are not altered, and only phase shifts are imparted as a result of the interaction, so that each wave continues to travel as an independent entity.

At a certain level of intensity and for certain pulse profiles, the effects of self-phase modulation and group-velocity dispersion are balanced so that a stable pulse, the soliton, travels without spread. The compensation effect between self-phase modulation and group-velocity is such that any slight spreading of the pulse enhances the compression process, and any pulse narrowing reduces the compression process, so that the pulse shape and width are maintained. The mathematical analysis of this phenomenon has so far been based on approximate solutions of Maxwell's nonlinear wave equations.

As used herein, the term soliton refers to generic solutions describing pulses that propagate without change, and may be temporal or spatial. Spatial solitons are monochromatic, self-guided beams that are localized spatially in the transverse plane. They travel in a nonlinear medium without altering their spatial distribution, as a result of the balance between diffraction and self-phase modulation. Spatial solitons are the transverse analogs of temporal or longitudinal solitons.

Optical pulses including solitons, may be used for photonic switching and computing. Switching is an essential operation in communication networks. It is also a basic operation in digital computers and signal processing systems. The current rapid development of high-data-rate fiber-optic communications systems has created a need for high capacity repeaters and terminal systems for processing optical signals, and therefore, a need for high-speed photonic switches. Similarly, the potential for optical computing can optimally be realized if large arrays of fast photonic gates, switches, and memory elements are developed.

As used herein, a switch is a device that establishes and releases connections among transmission paths, such as in communication or signal-processing systems. A control unit processes the commands for connections and sends a control signal to operate the switch in the desired manner.

A switch is generally characterized by the following parameters:

Size: number of input and output lines.

Directions: whether data can be transferred in one or more directions.

Switching time: time necessary for the switch to be reconfigured from one state to another.

Propagation delay time: time taken by the signal to cross the switch.

Throughput: maximum data rate that can how through the switch when it is connected.

Switching energy: energy needed to activate and deactivate the switch.

Power dissipation: energy dissipated per second in the process of switching.

Insertion loss: drop in the signal power introduced by the connection.

Crosstalk: undesired power leakage to other lines.

Optical signals may be switched by the use of electrical, acoustic, and magnetic switches. For instance, in electro-optic switches, the optical signals are converted into electrical signals using photodetectors, switched electronically, and then converted back into light using LEDs or lasers. These optical/electrical conversions introduce unnecessary time delays and power loss, in addition to the loss of the optical phase caused by the process of detection. Therefore, direct optical switching is clearly preferable to non optical switching.

In an all-optical (or opto-optic) switch, light controls light with the help of a nonlinear optical material. Nonlinear optical effects may be direct or indirect, and may be used to make all-optical switching devices. All-optical switching devices have the capability of switching at much higher rates than non optical switching devices. Exemplary all-optical switching devices are described in Friberg, S. R., Weiner, A. M., Silberberg, Y., Sfiz, B. G., and Smith, P. W., "Femtosecond switching in a dual-core-fiber nonlinear coupler", Optics Letters, Vol. 13, No. 10, pp. 904–906, October, 1988.

Currently, there exists a number of all-optical switching devices, including the birefringent-fiber polarization switch, the optical-fiber Kerr gate, the two-core-fiber nonlinear directional coupler, the birefringent single-core-fiber, the nonlinear fiber-loop mirror, the soliton dragging logic gate, the bistable nonlinear optical switching device, the spatial soliton beam switch in a planar waveguide, the nonlinear polarization switch in a semiconductor waveguide including a multiquantum well waveguide, the semiconductor interferometer switch, the nonlinear Bragg semiconductor waveguide switch, and the bistable optical switch. A general description of such all-optical devices can be found in Saleh, B. E. A., and Teich, M. C., "Fundamentals of Photonics", John Wiley, 1991; and Agrawal, G. P., "Nonlinear Fiber Optics", Academic Press, 2nd Ed., 1995.

Spatial and temporal solitons have been produced in the laboratory and used for all-optical switching. Bell, T. E., in an article entitled "Light that acts like 'natural bits'", IEEE Spectrum, pp. 56–57, August 1990, introduces the different types of solitons (temporal and spatial), and the possible uses of these solitons mainly in fiber optic communications, i.e., temporal solitons for long range communications and spatial solitons for optical switching. Reference is also made to Aitchison, J. S., Weiner, A. M., Silberberg, Y., Oliver, M. K., Jackel, J. L., Leaird, D. E., Vogel, E. M., and Smith, P. W. E., "Observation of spatial optical solitons in a nonlinear planar waveguide," Optics Letters, Vol.15, No. 9, pp. 471–473, May 1, 1990, which describes the power levels for creating spatial solitons beams in the laboratory, and the process of making a corresponding waveguide.; and to Aitchison, J. S., Silberberg, Y., Weiner, A.M., Leaird, D. E., Oliver, M. K., Jackel, J. L., Vogel, E. M., and Smith, P. W. E., "Spatial optical solitons in planar glass waveguides," Journal Optical Society of America B, Vol. 8, No. 6, pp. 1290–1297, June 1991, which further describes the interaction between solitons beams, and the type of glass material used (Schott B270 glass). Both of these articles to Aitchison et al. are incorporated herein by reference. This type of glass has a relatively weak nonlinear coefficient, with a nonlinearity value $n_2=4 \times 10^{-15}$ cm$^2$/W.

Borrelli, N. F., Aitken, B. G., and Newhouse, M. A., in an article entitled "Resonant and non-resonant effects in photonic glasses," Journal of Non-Crystalline Solids, pp. 109–122, Vol. 185, (1995), which is incorporated herein by reference, publish the result of research done on glasses and polymers that exhibit large nonlinear susceptibilities, and list these materials and their characteristic properties on page 111. However, this article does not address the future possibility of generating light bullets using the listed materials. Reference is made to pages 120 and 121, "4. Conclusion/future".

Temporal soliton pulses are confined in the direction transverse to propagation by propagating in a fiber. A more maneuverable temporal soliton would be able to move in a transverse direction, such as in a planar slab waveguide. Such special types of solitons are referred to as "light bullets". Light bullets are essentially pulses of light which, when propagating in a nonlinear material, maintain their shapes under the effect of diffraction (spreading transverse to the direction of propagation), dispersion (spreading in the direction of propagation), and nonlinearity.

However, light bullets have so far only been studied theoretically, and have not yet been produced in a laboratory. Additionally, until recently, light bullets were believed to be unstable, unless the material is saturable. Reference is made to Silberberg, Y., "Collapse of optical pulses", Optics Letters, Vol. 22, pp. 1282–1284, Nov. 15, 1990, which indicates that "the saturation of the nonlinear index (practically attainable only in gaseous systems)". The analysis in this article is based on the nonlinear Schrödinger equations, which, in turn, is an approximation of Maxwell's equations. In essence, the author stated that light pulses will collapse. However, this analysis resorted to an approximation which neglects higher order terms in resolving Maxwell's equations, and did not take into account factors that limit the collapse, such as higher order dispersion.

A computer simulation that uses the exact Maxwell's equations without any approximation, and which therefore automatically accounts for higher order terms of all orders that would occur in an approximate approach, was done and was published by Goorjian, P. M. and Silberberg, Y. "Numerical simulations of light bullets, using the full vector, time dependent Maxwell equations," Nonlinear Optics Topical Meeting, IEEE/Lasers and Electro-Optics Society and Optical Society of America, Waikoloa, Hi., Jul. 24–29, 1994.; and Goorjian, P. M. and Silberberg, Y., "Numerical simulation of light bullets, using the full vector, time dependent Maxwell equations," Integrated Photonics Topical Meeting, cosponsored by the Optical Society of America and IEEE/Lasers and Electro-Optics Soc., Dana Point, Calif., February 23–25, 1995. Both of these articles are incorporated herein by reference.

This later study showed that light bullets are in fact stable, and that there is no need for saturation of the material to obtain stability. This study also very briefly mentions that light bullets can deflect each others' travel paths upon collision. These light bullets will be on the order of 25 to 250 femtoseconds in duration, where one femtosecond is one millionth of one billionth of a second ($10^{-15}$ second). This study proposed a mathematical model for light bullets and used a hypothetical glass material with conjectured dispersion parameters.

None of the existing or previously proposed all-optical switching devices use or propose the use of light bullets in planar slab waveguides made from actual and commercially available nonlinear optical glass. Devices that use semiconductor materials, such as Aluminum Gallium Arsenic (AlGaAs) will suffer from positive group velocity dispersion in the visible and near infrared wavelength. However, negative group velocity dispersion is needed to form light bullets, which is a property of nonlinear optical glass. Several of the prior devices are relatively large physically or use relatively large optical pulses, as compared to the proposed device. In some of those prior devices, such as the two-core-fiber nonlinear directional coupler, the light pulses interact relatively weakly through evanescent waves. The spatial soliton devices suffer from the effects of dispersion on the pulses and the temporal soliton devices are confined to fibers and hence do not have the maneuverability of pulses in waveguides. None of the prior devices use light bullets, which are extremely small, maneuverable and do not degrade on propagation, (i.e. are self sustainable).

Therefore, there is still a great and unsatisfied need for a practical realization of an ultra-fast all-optical photonic switching device utilizing light bullets. The material used to build this device should be readily available and relatively inexpensive to manufacture, and it should further exhibit characteristic parameters that are adequate for the production of light bullets.

SUMMARY OF THE INVENTION

The present invention provides a unique ultra-fast, all-optical switching device made with readily available, relatively inexpensive, highly nonlinear optical glasses. This switching device uses stable light bullets as optical pulses that switch each others' direction of propagation. As used herein, "ultra-fast" optical devices are defined to include optical devices in which the nonlinear response of the material is electronic in origin and hence the response of the material is on the order of a few femtoseconds.

In one embodiment, the switching device of the present invention utilizes a planar slab waveguide.

One advantage presented by the present all-optical switching device lies in its practical use of light bullets, thus preventing the degeneration of the pulses due to dispersion and diffraction at the front and back of the pulses.

Another feature of the present all-optical switching device is the relative insensitivity of the collision process to the time difference in which the counter-propagating pulses enter the waveguide, since, contrary to conventional co-propagating spatial solitons, the relative phase of the colliding pulses does not affect the interaction of these pulses.

Yet another feature of the present all-optical switching device is the selection of the light pulse parameters which enables the generation of light bullets in highly nonlinear glasses.

Briefly, the foregoing and other features of the present invention are achieved by providing a unique ultra-fast, all-optical switching device made with readily available, relatively inexpensive, highly nonlinear photonic glasses. These photonic glasses have a sufficiently negative group velocity dispersion and high nonlinear index of refraction to support stable light bullets. The light bullets counterpropagate through, and interact within the waveguide to selectively change each others' directions of propagation into predetermined channels. In one embodiment, the switch utilizes a rectangularly planar slab waveguide, and further includes two central channels and a plurality of lateral channels for guiding the light bullets into and out of the waveguide.

BRIEF DESCRIPTION OF THE DRAWING

The above and other features of the present invention and the manner of attaining them, will become apparent, and the invention itself will be best understood, by reference to the following description and the accompanying drawings, wherein.

Similar numerals refer to similar elements in the drawing. It should be understood that the sizes of the different components in the Figures are not in exact proportion, and are shown for visual clarity and for the purpose of explanation.

DETAILED DESCRIPTION OF THE INVENTION

Figure 1:
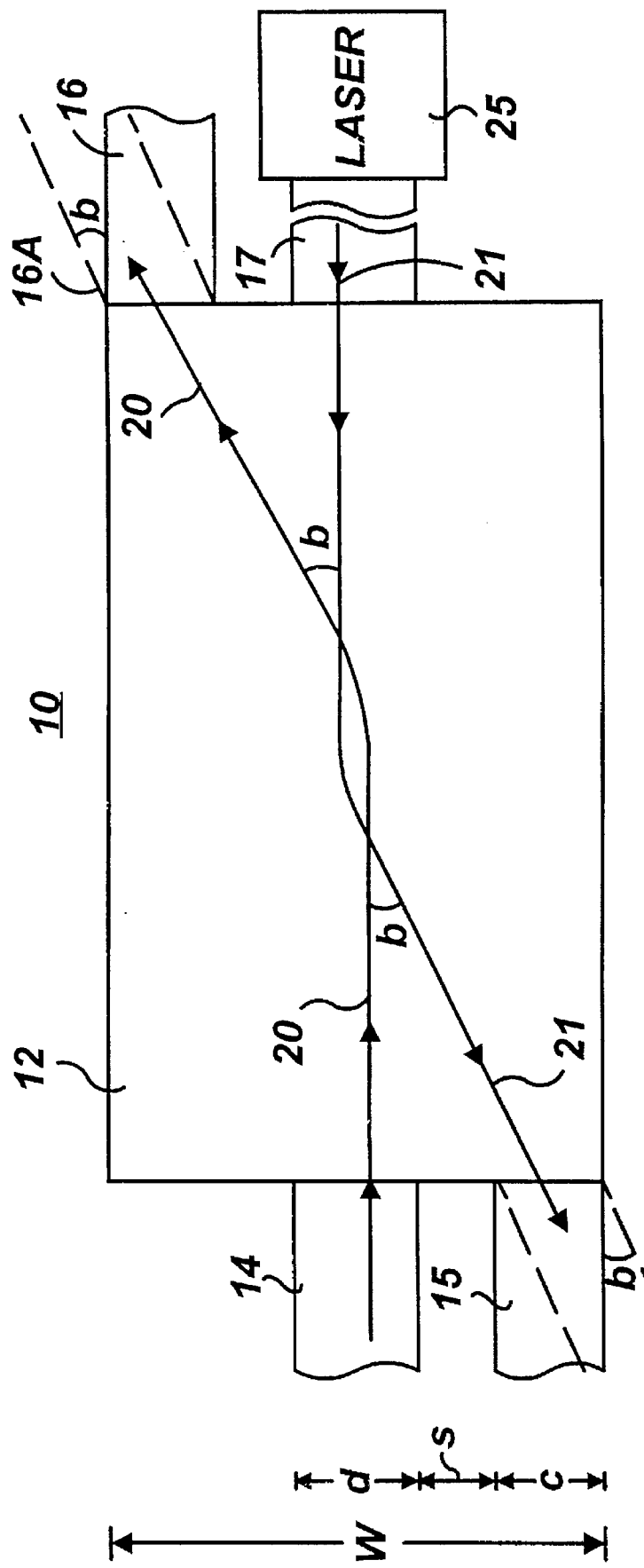
FIG. 1 is a schematic top plan view of a four-channel switching device made according to the present invention.

FIG. 1 illustrates a four-channel ultra-fast, all-optical switch or switching device 10 according to the present invention. The switch 10 includes a single planar, rectangularly shaped slab waveguide 12 and a plurality of channels 14, 15, 16 and 17 that integrally depend from the waveguide 12 to provide input and output paths for the switch 10. The switch 10 may be made from highly nonlinear photonic glasses, and uses stable light bullets 20, 21 as optical pulses to switch each others' direction of propagation.

In this exemplary embodiment, the waveguide 12 is rectangularly shaped, and has a length "L" of about 1 cm, a width "W" of about 950 µm, and a thickness of about 2 µm. It should be clear to those of ordinary skill in the field that other shapes and dimensions may be selected. In particular, the waveguide length "L" is not necessarily limited to 1 cm, and longer dimensions can be selected. Planar slab waveguides made of the nonlinear photonic glasses proposed herein, with several centimeters in length are reasonable, in that these photonic glasses can be made to sizes that large. In other designs, it would be preferable to minimize the size of the switch 10 to make it more compact.

Figure 5:
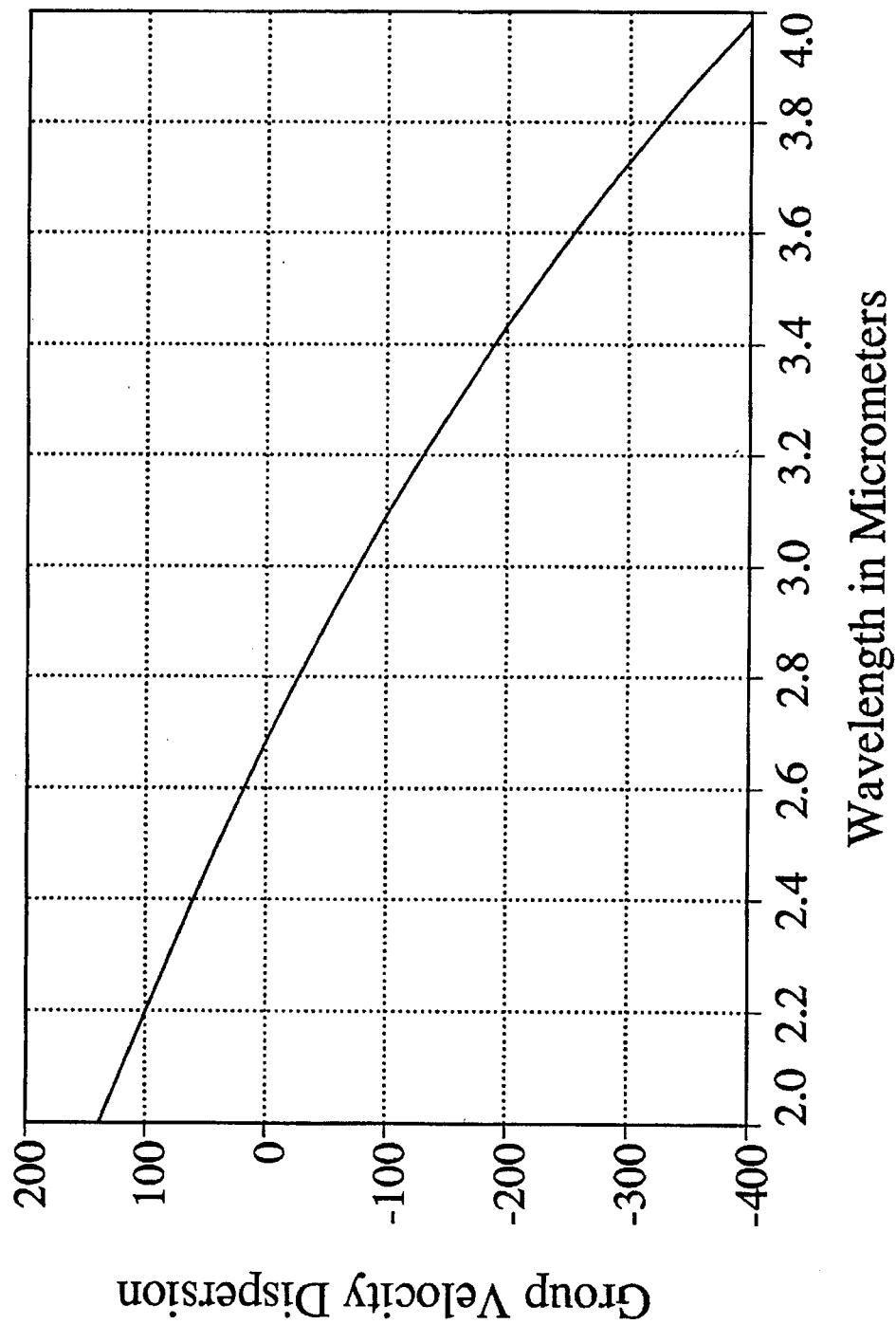
FIG. 5 is a graph plotting the group velocity dispersion versus the wavelength for the nonlinear glass for use in the fabrication of the switching device of FIGS. 1 through 3.

The glass planar slab waveguide 12 may be manufactured according to a process that is similar to the ion exchange process described in the above two articles to Aitchison et al. A proposed nonlinear photonic glass is lead bismuth-gallate glass, developed at Corning Research and Development Laboratory, and named RN glass. This type of glass and its corresponding parameters are described in the above article to Borrelli et al. This photonic glass is a doped glass, and is highly nonlinear. It has a nonlinear index of refraction $n_2=1.11\times10^{-14}$ cm$^2$/W, which is about three times stronger than the glass proposed in the above Aitchison articles. For RN glass, light with a wavelength of about 3.5 µm gives a group velocity dispersion of −220 psec$^2$/km, as shown in FIG. 5.

As explained in the Saleh et al., and Agrawal references cited above, the nonlinear effect is due to the product of the nonlinear index of refraction, times the intensity of the optical pulse. Therefore, as the nonlinear index of refraction is increased, the power requirement can be decreased. It would thus be desirable to use the highest available nonlinearity at low power levels, provided the other waveguide material parameters are suitable for the production of light bullets.

The four channels 14 through 17 are comprised of two generally identical, elongated central channels 14, 17 that are oppositely disposed relative to the waveguide 12. The axes of symmetry of these two central channels 14, 17 coincide. Each of the central channels 14, 17 has a width "d" of about 25 µm. The other two side or lateral channels 15, 16 are disposed on either side of the waveguide 12, in a generally symmetrical relation relative to the geometrical center of the waveguide 12. Each of the exit channels 15, 16 has a width "c" of about 20 µm, and is separated from its respective adjacent central channel 14, 17, by a distance "s" of about 15 µm.

The light bullets 20, 21 used in the switch 10 have a temporal duration of approximately 100 femtoseconds, where the duration is the measure of the full width at half maximum value (FWHM) divided by 1.76 of the peak value of the intensity of the electric field. For RN glass, the proposed wavelength of the optical carrier is about 3.5 µm, which is in the infrared wavelength range. Referring to FIG. 5, the group velocity dispersion for the RN glass is calculated at this wavelength, and found to be −220 psec$^2$/km, where "psec" refers to picoseconds. Additionally, this wavelength is well beyond the absorption edge of 480 nanometers, so that no single or multiple photon absorption is expected to occur.

The spatial width $a_0$ of the pulse forming the light bullets 20, 21, is estimated to be 10 µm. The transverse mode size of the pulse is estimated to equal the thickness of the waveguide, which is about 2 µm. Using the equation in the above Aitchison et al. article, and in particular equation (4), the required power to produce the pulse is estimated to be 150 kW, which is within the capability of currently available laser equipment, i.e., laser 25. The corresponding energy in a pulse is estimated to be 15 nanojoules ($15\times10^{-9}$ joules), which is a significantly small amount of energy.

In use, a sequence of counter-propagating light bullets 20, 21 are selectively injected through the central channels 14, 17, into the waveguide 12, so that they change each others' direction of propagation, thus achieving all-optical switching. A light bullet 20 that is sent into the waveguide 12 from the central channel 14 will propagate through the waveguide 12 along a straight travel path, and will exit into the central channel 17. When two counter-propagating light bullets 20, 21 are introduced into the waveguide 12 from the central channels 14 and 17, and are axially displaced relative to each other, in the transverse direction, by the spatial width $a_0$ of a single light bullet, these light bullets 20, 21 will collide and will deflect each other.

This interaction is an attractive one in that the light bullets 20, 21 attract each other as they pass. The result will be that the light bullets 20, 21 entering from the central channels 14 and 17, will exit into the lateral channels 16 and 15, respectively. The interaction between the light bullets 20, 21 forms the mechanism for the optical switch 10.

In the example illustrated in FIG. 1, the light bullet 20 from the central channel 14 is displaced downward with respect to the light bullet 21 from the central channel 17, causing the deflection angle "b" to be approximately ½ (one half of one degree), in the case of the RN glass. It should however be clear that the deflection angle may have different values, as desired, to better suit the particular application in which the switch 10 is used. In some designs, it would be preferable to select the largest obtainable value for the deflection angle. The deflection angle is determined by the light bullet power level, the material parameters and the shape of the light bullet pulse. For instance, if the light bullet power intensity were increased, the deflection angle would increase accordingly. Additionally, the deflection angle determines the length "L" of the waveguide 12.

While a particular example of the switch 10 has been described, it should be understood that alternative pulse shapes, sizes and intensities may be possible to determine the optimal properties of the light bullets. For instance, various carrier frequencies are possible since the value of the group velocity dispersion changes with frequency. Also, it is possible to use different frequencies for the counter-propagating light bullets 20, 21. These alternative changes can be aimed at producing narrower light bullets with higher intensities for stronger interactions under collision.

Alternative nonlinear photonic glasses, such as those listed in Borrelli, N. F., Aitken, B. G., and Newhouse, M. A., "Resonant and non-resonant effects in photonic glasses," Journal of Non-Crystalline Solids, pp. 109–122, Vol. 185, (1995), may be used to generate light bullets with the desired characteristic properties. Among the nonlinear glasses and polymers listed in this article, RN glass is considered to possess desirable parameters for the generation of light bullets. Some of these parameters include: group velocity dispersion, nonlinear refractive index, and operating wavelength. Other exemplary photonic glasses that may be used in the implementation of the present invention are listed in the Borrelli et al. article and have a refractive index ranging between approximately 2.7 $m^2/W\times10^{-20}$ and 475 $m^2/W\times10^{-20}$.

An objective of the present invention is to obtain the minimum power requirements and the most practical operating wavelength for the desired application. At a predetermined intensity, it is possible to select a group velocity dispersion of the material, which, when considered with other parameters, determines the width and the power level of the light. Given a material such as RN glass, a wavelength must be determined in order to obtain a reasonable amount of negative group velocity dispersion. This value of group velocity dispersion is used together with the nonlinear index of refraction and intensity to determine the length and width of a pulse that will form a light bullet. Also, the intensity is chosen to satisfy two requirements. First, a reasonable power level that is attainable with available power sources, such as laser equipment; and second, the intensity is such that it is sufficient to produce a strong interaction between colliding light bullets. It may also be possible to use various semiconductor materials such as GaAs, AlGaAs, and InGaAsP in the fabrication of the switch 10.

FIG. 1 illustrates a modification to the switch 10, in which the lateral channels 15A and 16A (shown in dashed lines) are so positioned as to form an angle "b" (i.e., equal to the deflection angle) with respect to the central axis of the waveguide 12. In such a design, the deflected light bullets 20, 21 exit the waveguide 12 through the exit lateral channels 16A and 15A, parallel to the sides of these channels.

While the foregoing switch design has been proposed relative to a thin film planar slab waveguide 12, it should be understood that the waveguide 12 may be made from bulk material for providing the light bullets with directions of propagation out of the plane of the waveguide 12 (FIG. 1).

Figure 2:
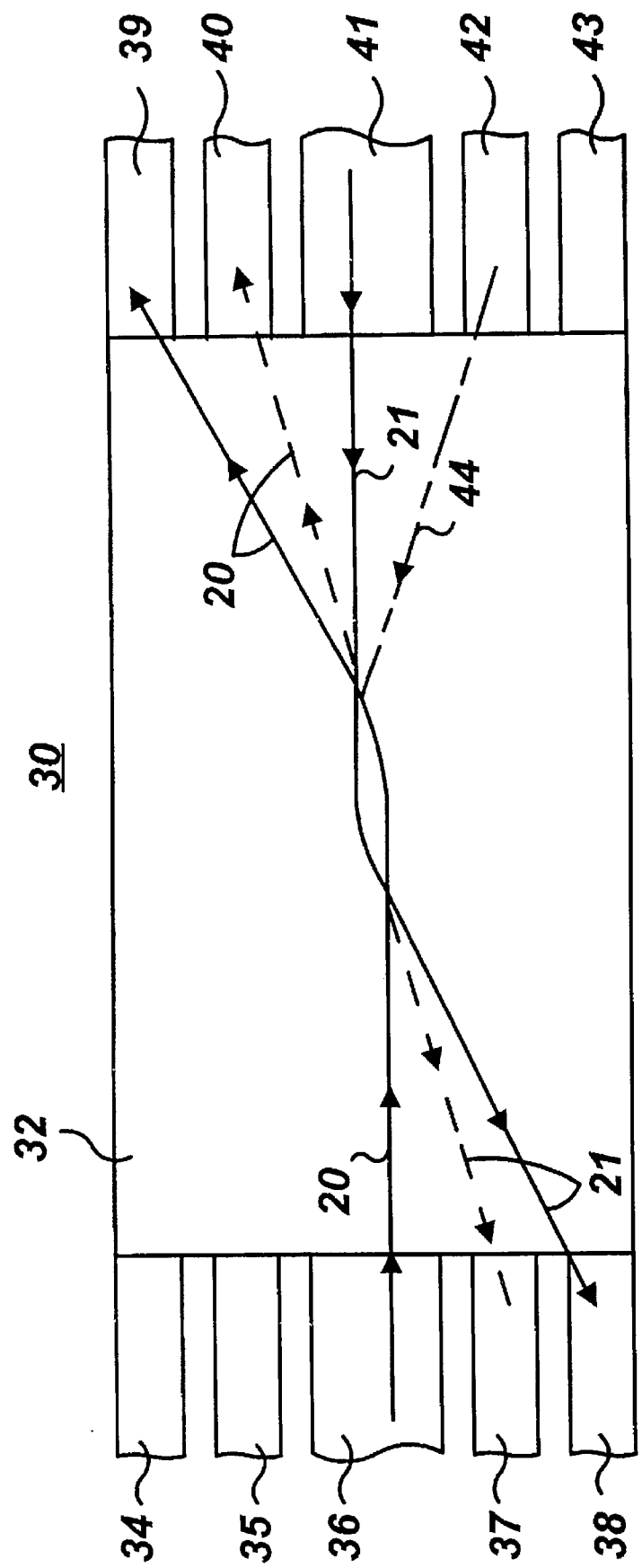
FIG. 2 is a schematic top plan view of a multi-channel switching device made according to the present invention, and showing two possible switching paths.
Figure 3:
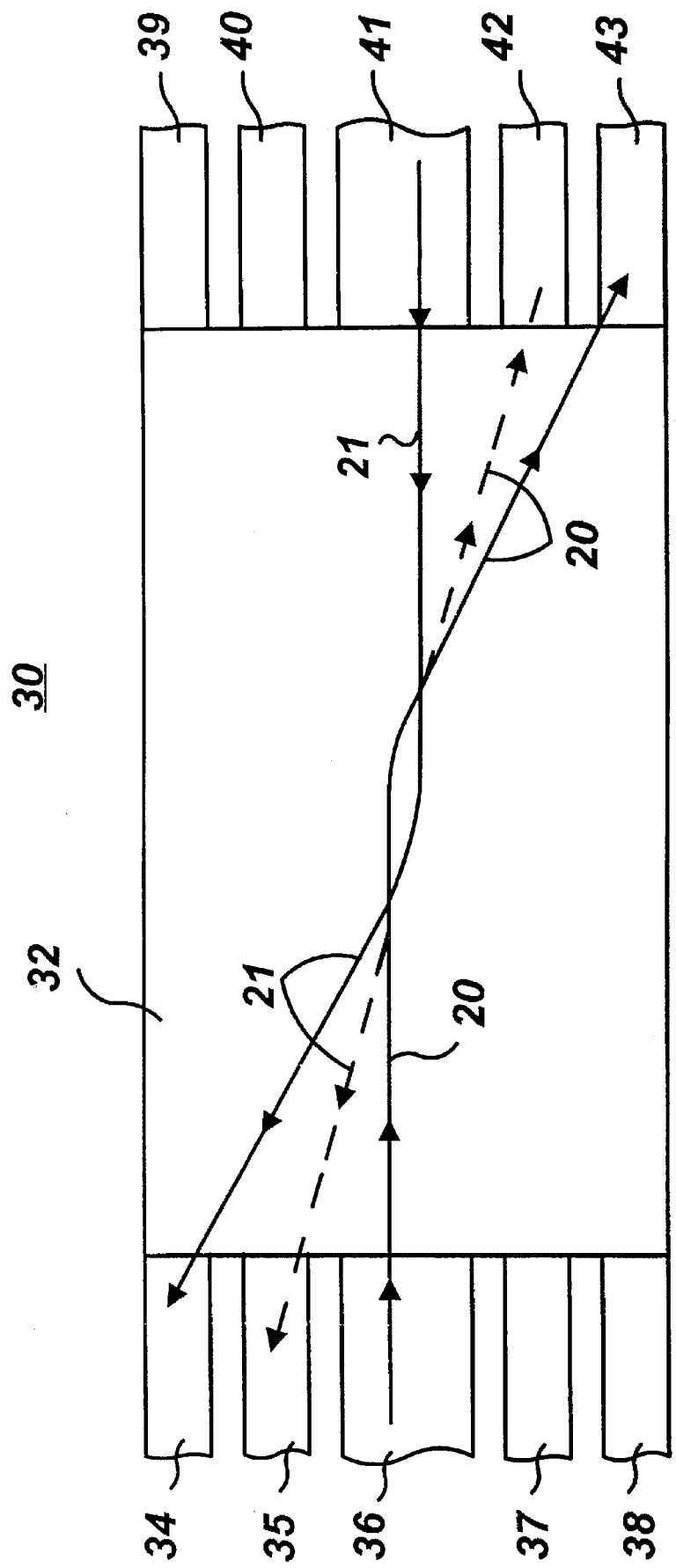
FIG. 3 is a schematic top plan view of the multi-channel switching device of FIG. 2, showing two additional switching paths.

FIGS. 2 and 3 illustrate another switch design, wherein a switch 30 includes a waveguide 32 that is generally similar in design and construction to the waveguide 12 of FIG. 1, but possibly different in dimensions. The switch 30 further includes a plurality of spaced apart channels, such as two central channels 36, 41, and eight side or lateral channels 34, 35, 37, 38, 39, 40, 42, 43. The central channels 36, 41 are generally similar in design, construction and dimensions to the central channels 14, 17 of switch 10. The lateral channels 34, 35, 37, 38, 39, 40, 42, 43 are generally similar to the lateral channels 15, 16 or 15A, 16A shown in FIG. 1.

Two lateral channels 34, 35 are disposed on one side of the central channel 36. Two other lateral channels 37, 38 are disposed on the other side of the central channel 36. Similarly, two lateral channels 39, 40 are disposed on one side of the central channel 41, while two other channels 42, 43 are disposed on the other side of the central channel 41.

While FIGS. 2 and 3 illustrate the lateral channels 34, 35, 37, 38, 39, 40, 42, 43 as being symmetrically disposed relative to the central channels 26, 41, it should be understood that variations in the separations of these lateral channels relative to each other and to the central channels 36, 41 are also covered by the present invention.

A purpose of the switch 30 is to present different collision—travel paths for the light bullets 20, 21. For instance, assume that in one particular application the light bullet 20 needs to be switched among five different channels 39 through 43, then, by controlling the intensity of the light bullet 21 and its axial displacement relative to the light bullet 21, it would be possible to cause the light bullet 20 to be deflected and to exit into any of the channels 39 through 43. If the light bullet 21 were not injected into the central or input channel 17, then the light bullet 20 will not be deflected, and it will exit the switch 30 through the central channel 41.

For instance, FIG. 2 illustrates the light bullet 21 as being axially displaced above the light bullet 20. In this manner, as the counter-propagating light bullets 20, 21 collide and attract each other, the light bullet 20 is deflected upward into either of the lateral channels 39 or 40. If the intensity of the light bullet 21 is sufficiently high, or is increased, then it will cause the light bullet 20 to be deflected into the upper lateral channel 39. On the other hand, if the intensity of the light bullet 21 is relatively low, or is decreased, then the light bullet 20 is deflected into the lower lateral channel 40.

FIG. 3 illustrates a similar process as that described above in connection with FIG. 2, with the exception that the light bullet 21 is axially displaced below the light bullet 20. In this manner, as the counter-propagating light bullets 20, 21 collide and attract each other, the light bullet 20 is deflected downward into either of the lateral channels 42 or 43. If the intensity of the light bullet 21 is sufficiently high, or is increased, then it will cause the light bullet 20 to be deflected into the lateral channel 43. On the other hand, if the intensity of the light bullet 21 is relatively low, or is decreased, then the light bullet 20 is deflected into the lateral channel 42.

As such, by controlling the position and intensity of the light bullet 21, it is possible to control the switching level or mode of the light bullet 20, thus realizing a multi-level switch 30. In this switch 30, the light bullet 20 may represent the data signals to be switched while the light bullet 21 may represent the control signal that activates the switching.

While only ten channels 34 through 43 are shown in FIGS. 2 and 3, as being positioned along two opposite sides of the waveguide 32, for illustration purpose only, it should be understood that a different number of channels may be selected and positioned along the remaining sides of the waveguide 32.

FIG. 2 illustrates yet an alternative switching arrangement for the switch 30, whereby the light bullet 20 is injected into the central channel 36 and a counter-propagating light bullet 44 is injected into the lateral channel 42. Both light bullets 20, 21 are angularly directed at each other, with a slight angle in their travel paths. This change in direction will allow the light bullet 44 to be injected from a lateral channel such as the lateral channel 42, rather than from the central channel 41.

In yet another embodiment of the switches 10, 30, and still referring to FIGS. 1 through 3 for illustration, the light bullets may be injected, either simultaneously or serially, into one or more of the central and / or the lateral channels (referred to as the input channels) for selective deflection or switching into selected lateral channels (referred to as the exit or output channels).

Figure 4:
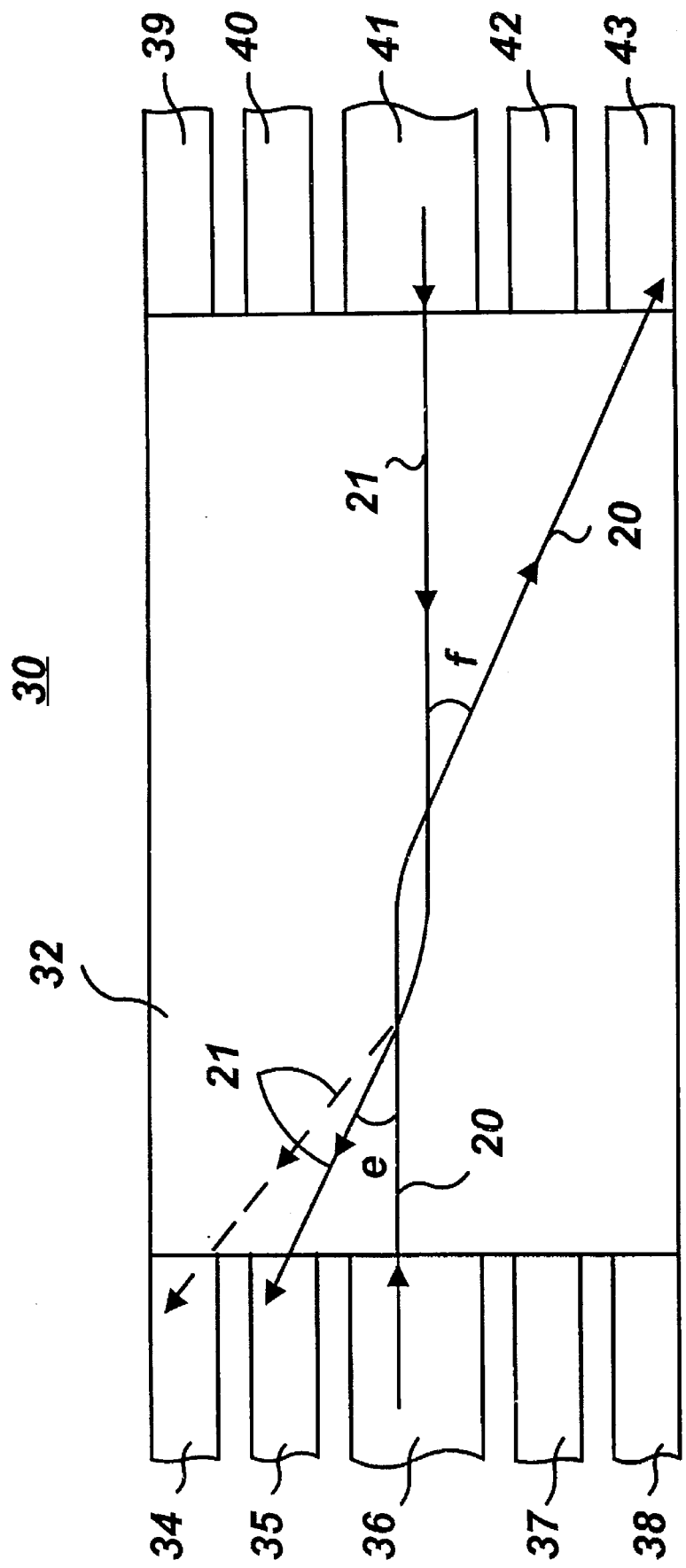
FIG. 4 is a schematic top plan view of the multi-channel switching device of FIGS. 2 and 3, showing yet two possible additional switching paths.

Still another embodiment of the switches 10, 30, is illustrated in FIG. 4, wherein the light bullets 20, 21 do not necessarily meet around the center of the waveguide 32, and wherein each light bullet is selectively switched to a predetermined exit channels. This selective switching may be achieved by regulating the intensity of each light bullet and the timing of the inter-light bullet collision, so as to cause the light bullets 20, 21 to deflect along predetermined travel paths. In this particular example, the collision occurs closer to the central channel 36 than to the central channel 41, and presuming that the intensities of the light bullets 20, 21 are about the same, the deflection angles "e" and "f" of the light bullets 21 and 20, respectively, are about equal, so that the light bullet 21 is deflected into the exit channel 35, while the light bullet 20 is deflected into the exit channel 43. In this example, the intensities of the light bullet 20 could be increased so as to attract the light bullet 21 further upon collision, thus causing it to be injected into the exit channel 34, with its corresponding travel path 46 being shown in dashed lines.

While specific embodiments of the photonic switching devices using light bullets have been illustrated and described in accordance with the present invention, modifications and changes of the apparatus, parameters, and composition, use and operation will become apparent to those skilled in the art, without departing from the scope of the invention.

What is claimed is:

1. A multi-channel, ultra-fast, all-optical switch using stable light bullets as optical pulses, and comprising in combination:

a waveguide;

a plurality of channels extending from said waveguide to provide input and output travel paths for the light bullets;

said waveguide and said plurality of channels being made from a photonic glass having a sufficiently negative group velocity dispersion and high nonlinear index of refraction to support the stable light bullets; and the light bullets counterpropagating through, and interacting within said waveguide to selectively change each others' directions of propagation into predetermined channels.

2. The switch according to claim 1, wherein said photonic glass has a nonlinear index of refraction ranging between approximately $2.7 \times 10^{-16}$ cm$^2$/W and $475 \times 10^{-16}$ cm$^2$/W.

3. The switch according to claim 2, wherein said photonic glass includes a lead-bismuth-gallate doped glass and has a nonlinear index of refraction of $111 \times 10^{-16}$ cm$^2$/W.

4. The switch according to claim 3 wherein light propagating through said photonic glass and having a wavelength of about 3.5 μm gives a group velocity dispersion of approximately $-220$ psec$^2$/km.

5. The switch according to claim 4, wherein the light bullets include an electric field component, and have a temporal duration of approximately 100 femtoseconds, where the duration is the measure of the full width at half maximum value (FWHM) divided by 1.76 of the peak value of the intensity of the electric field component.

6. The switch according to claim 1, wherein said waveguide includes a single planar, rectangularly shaped slab of highly nonlinear glass.

7. The switch according to claim 6, wherein said waveguide has a length of approximately 1 cm, a width of approximately 950 μm, and a thickness of approximately 2 μm.

8. The switch according to claim 1 wherein the counter-propagating light bullets are axially displaced relative to each other, in the transverse direction, by approximately the spatial width of a single light bullet.

9. The switch according to claim 8, wherein the dimensions of said plurality of channels and said waveguide are determined by the spatial width of the light bullets and the interaction of two counterpropagating light bullets.

10. The switch according to claim 9, wherein the spatial width of the light bullets is approximately 10 microns.

11. The switch according to claim 8, wherein said plurality of channels include:

two central channels that are oppositely disposed relative to said waveguide, for guiding the light bullets along predetermined propagation paths into and out of said waveguide; and at least two lateral channels that are disposed on either side of said waveguide in a generally symmetrical relation, for guiding the light bullets out of said waveguide.

12. The switch according to claim 11, wherein the counterpropagating light bullets define a deflection angle between their changed directions of propagation depending on their interaction; and wherein said deflection angle determines a length dimension of said waveguide.

13. The switch according to claim 12, wherein each central channel has a width of approximately 25 µm; and each of said lateral channels has a width of approximately 20 µm, and is separated from an adjacent central channel by a distance of approximately 15 µm.

14. The switch according to claim 12, wherein said deflection angle is approximately ½° (one half of one degree).

15. The switch according to claim 11, wherein said at least two lateral channels include eight lateral channels that are positioned on opposite sides of said waveguide.

16. The switch according to claim 15, wherein the light bullets propagate along corresponding travel paths; and wherein said travel paths are selectively determined by controlling the timing, intensity, and the axial displacement of the light bullets relative to each other.

17. The switch according to claim 11, wherein at least a first light bullet is injected into one of said central channels, and at least a second counter-propagating light bullet is injected into a lateral channel and is angularly directed at said first light bullet.

18. The switch according to claim 11, wherein the light bullets are injected simultaneously into one or more of said central and lateral channels.

19. The switch according to claim 1, wherein said waveguide is made from bulk material for providing the light bullets with other directions of propagation.

20. The switch according to claim 1, wherein said photonic glass is doped with a semiconductor material.

* * * * *